United States Patent [19]
Teller

[11] 3,928,765
[45] Dec. 23, 1975

[54] DETERMINING COMPOSITION OF A SUBSTANCE BY THE USE OF BOTH REFLECTED AND TRANSMITTED RADIATION

[75] Inventor: Steen Teller, Allerod, Denmark

[73] Assignee: Isotopcentralen, Copenhagen, Denmark

[22] Filed: Nov. 19, 1973

[21] Appl. No.: 417,407

[30] Foreign Application Priority Data
Nov. 22, 1972 Denmark .............................. 5819/72

[52] U.S. Cl. ................................. 250/272; 250/358
[51] Int. Cl. ............................................. G01n 23/00
[58] Field of Search ........... 250/272, 273, 274, 275, 250/276, 277, 278, 279, 358, 359, 360, 493, 494

[56] References Cited
UNITED STATES PATENTS

| | | | |
|---|---|---|---|
| 2,642,537 | 6/1953 | Carroll et al. | 250/279 |
| 3,270,204 | 8/1966 | Rhodes | 250/272 |
| 3,467,824 | 9/1969 | Boyce et al. | 250/273 |
| 3,764,805 | 10/1973 | Alley | 250/273 |

*Primary Examiner*—Archie R. Borchelt
*Attorney, Agent, or Firm*—Watson, Cole, Grindle & Watson

[57] ABSTRACT

An apparatus for the determination of the content of sulphur in hydrocarbon fuels comprising a primary and a secondary source of γ- or X-rays arranged on opposite sides of a test zone and a detector connected to a recording device for detecting and recording backscattered and transmitted rays emitted by the radiation sources.

6 Claims, 4 Drawing Figures

DETERMINING COMPOSITION OF A SUBSTANCE BY THE USE OF BOTH REFLECTED AND TRANSMITTED RADIATION

BACKGROUND OF THE INVENTION

The present invention relates to an apparatus for the determination of the content of at least one chemical element in a medium by an electromagnetic radiation method and especially for the determination of the sulphur content in hydrocarbon fuels.

it is well known that the absorption of γ- or X-rays increases with increasing atomic numbers of elements contained in a medium being subjected to radiation with γ- or X-rays. This relationship is particularly pronounced when using γ- or X-rays having an energy of less than 100 keV.

Two types of methods can be used for the determination of the content of a given element in a test medium by radiation with γ- or X-rays. One type is the transmission method in which the radiation obtained by transmitting rays from a radiation source through the test medium is measured by a detector which is arranged on the opposite side of the test medium undergoing measurement. The second type is the backscattering method in which only the scattered rays are detected. In an apparatus based on the backscattering method the radiation source and the detector are arranged on the same side of the test medium.

A serious drawback of apparatuses based on either the transmission method or the backscattering method is that the detected radiation also depends on other factors than the atomic number of the element contained in the test medium undergoing measurement. Thus, it has been found that the detected radiation also depends on the density and the chemical composition of the medium containing the element, the concentration of which is to be determined. By special precautions the effect of the chemical composition of said medium can be eliminated whereas hitherto it has been impossible to eliminate the effect of variations in the density of the test medium. Especially in an apparatus based on the transmission method the effect of variations in density is so pronounced that correction of the measurement has to be made following a separate determination of the density of the test medium.

British patent specification No. 965.303 states that the radiation detected by a backscattering method is not dependent on variation in sample mass per unit area provided that a sufficient thickness of sample is used to cause backscattering.

It has been found that this statement is incorrect in cases where the density of the test medium is small and in cases where the atomic number of the element, the concentration of which is to be determined, is low. Thus, e.g. the content of sulphur in a hydrocarbon fuel cannot be determined even if a backscattering method is used without a separate determination of the density of said fuel and making a correction corresponding to the density measured.

It appears that variations in the density of the test medium produce such changes of the average path length of the radiation from the radiation source to the detector that the measurements become significantly changed. It is noted that the very same effect, viz. the change of average path length, forms the basis of a well known method for the determination of the density of soil by a radiation method.

OBJECTS OF THE INVENTION

The object of the present invention is to provide an apparatus, the readings of which do not depend on variations of the density of the test medium within the range of variations normally encountered.

Another object of the invention is to provide an apparatus for the determination of the content of sulphur in hydrocarbon fuels.

Other objects and advantages will appear from the following description of the invention.

SUMMARY OF THE INVENTION

The apparatus of the invention comprises at least one primary electromagnetic radiation source, at least one detecting device connected to a recording device, the primary radiation source and the detecting device being arranged on the same side of a test zone, and at least one secondary electromagnetic radiation source arranged on the opposite side of the test zone.

The operation of the apparatus of the invention will be described with reference to the drawings.

DESCRIPTION OF THE PREFERRED EMBODIMENTS

Figure 1:
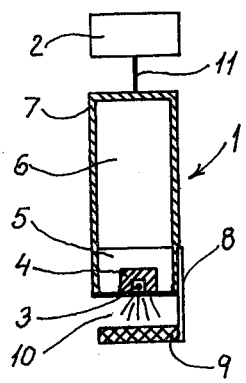
FIG. 1 is a schematic view of an embodiment of the apparatus of the invention.
Figure 2:
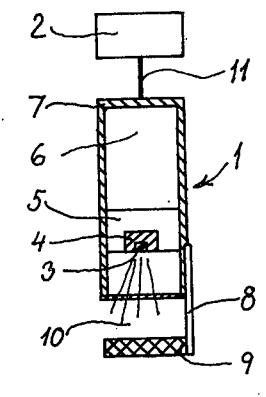

The apparatuses illustrated in FIGS. 1 and 2 comprise a detecting device 1 and a recording device 2. The detecting device 1 includes a primary electromagnetic radiation source 3 (γ- or X-rays), a radiation shield 4 which protects a scintillation crystal 5 and a photomultiplicator tube 6 connected thereto from being hit by direct radiation from the primary radiation source 3.

The above mentioned components are arranged in a thin metal pipe 7.

The detecting device 1 also includes a holder 8 supporting a reflector 9 arranged at some distance from the primary radiation source 3 and serving as a secondary radiation source. The space 10 between the primary radiation source 3 and the reflector 9 forms the test zone.

The recording device 2 includes a mechanism for counting and recording the pulses received from the detecting device 1 through a conduit 11.

The apparatus illustrated in FIG. 2 differs from that of FIG. 1 only as far as the location of the primary radiation source 3 with respect to the test zone 10 is concerned.

When using an apparatus as illustrated in FIGS. 1 or 2, the test medium is present at least in the test zone 10. However, the apparatus may also be immersed in the test medium which then completely surrounds the apparatus.

Figure 3:
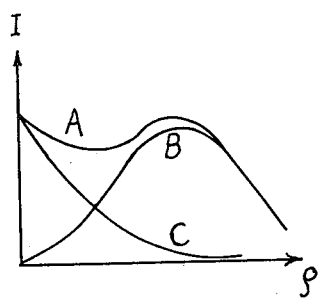
FIG. 2 is a schematic view of another embodiment of the apparatus of the invention and FIGS. 3 and 4 are graphs showing the relationship between the density ($\rho$) of a test medium and the intensity (I) of the detected radiation.

The apparatus illustrated in FIG. 1 may have a characteristic curve of a shape similar to that of the curve A illustrated in FIG. 3. The curve A is composed of two curves B and C. Curve B shows the relationship between the intensity of the detected radiation and the density of the test medium in cases where no reflector or other secondary radiation source is used. The location of the top of the curve i.e. the point at which $$\frac{dI}{d\rho} = 0,$$

can be adjusted at a desired valud by suitably adjusting the distance between the primary radiation source 3 and the scintillation crystal 5, the collimation at the primary radiation source and at the detector and/or the volume of the test medium undergoing measurement.

Thus, by increasing the distance between the primary radiation source 3 and the scintillation crystal 5, the top of the curve B moves towards lower $\rho$- values and at the same time the intensity of the detected radiation decreases. If the collimation is changed e.g. by changing the shape of the shield 4, the top moves towards higher or lower $\rho$-values depending on the changes effected. Finally by decreasing the volume of the test medium undergoing measurement the top of the curve moves towards higher $\rho$- values and at the same time the intensity decreases.

Curve C illustrates the relationship between the intensity detected and the density of the test medium when determining the intensity of the radiation transmitted through the test medium from the reflector 9.

As will appear from Curve A in FIG. 3

$$\frac{dI}{d\rho}$$

is zero (i.e. the detected intensity does not depend on the density of the test medium) within two intervals on the X-axis. It follows that by suitably adjusting the variables discussed above an apparatus as illustrated in FIG. 1 can be designed in such a manner that the readings on the apparatus are independent of the density of a given test medium within the range of densities normally encountered. In a particularly preferred embodiment of the apparatus shown, the point on the A-Curve at which $$\frac{dI}{d\rho} = 0$$

is also the point at which Curve A has its deflection tangent. In that case the readings of the apparatus are independent of the density over a wide range.

Figure 4:
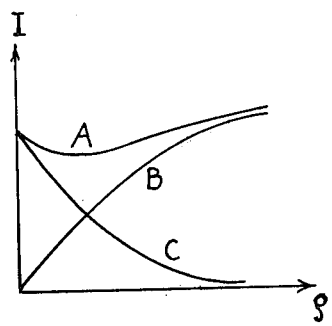

Curve A shown in FIG. 4 is a curve which is characteristic of an apparatus shown in FIG. 2. This curve is also composed of two curves B and C of which the latter corresponds to curve C in FIG. 3.

Curve B in FIG. 4 differs from Curve B in FIG. 3 because of the reflection at the surface of the test medium. Curve A in FIG. 4 has a minimum at which $$\frac{dI}{d\rho} = 0$$

and the location of said minimum relative to a given range of densities can be suitably adjusted by selecting proper values of the variables discussed above.

The curves shown in FIGS. 3 and 4 correspond to a given concentration of a chemical element in a medium. If the contents of the element is changed thus changing the average atomic number of the test medium, the curves shown will be displaced along the ordinate. Consequently, the detected radiation is a measure of the contents of the element in the medium.

The detection system illustrated comprising a scintillator crystal and a photomultiplicator tube is merely an example of a suitable system. Therefore, it should be understood that any detecting system which is sensitive to radiation can be used in the apparatus of the invention.

It should also be noted that two or more primary radiation sources, two or more detecting devices and/or two or more secondary radiation sources can be used in order to provide an apparatus for which the point at which $$\frac{dI}{d\rho} = 0$$

is located within the range of densities of a specific test medium. Thus, by using e.g. two primary radiation sources and by suitably adjusting the above mentioned variables so as to obtain B curves having their maxima at opposite ends of the density range in question, the resulting (A—) curve will have its maximum within the above mentioned density range.

As indicated above the secondary radiation source may be a separate active radiation source or a reflector which reflects the radiation received from the primary radiation source.

If a reflector is used, it should contain elements having a characteristic X-radiation which is strongly excited by the radiation of the primary radiation source.

No matter which type of secondary radiation source is used, the energy of the radiation of the radiation source should differ from that of the primary radiation source because different radiation energies increase the possibilities for compensating for the chemical composition of the medium containing the element in question.

In such cases, it is also possible to physically or electronically discriminate between the different radiation energies in order to bring the point in which $$\frac{dI}{d\rho} = 0$$

within the range of densities of the test medium.

When an apparatus of the invention is to be used for the determination of the content of sulphur in a fuel oil, the primary radiation source is preferably Americum-241 (AM-241) having a half-life of 450 years. Am-241 emits $\gamma$-radiation of an energy of 60 keV. Part of the radiation passes a silver sheet which converts the radiation into radiation having an energy of 22 keV.

The radiation transmitted through the fuel oil is converted by a molybdenum reflector into molybdenum X-rays (18 keV) which are transmitted through the oil to the detector.

The medium containing the element, the concentration of which is to be determined may be gaseous, liquid or solid. It is also possible to use the apparatus of the invention in connection with systems comprising two phases e.g. slurries.

The apparatus of the invention is particularly suitable for use in the determination of the sulphur content in fuel oils and more particularly for on-line analyses of such media. However, it is to be understood that the use of the apparatus is not limited to the determination of the content of this specific element in such specific media. Thus, the apparatus can e.g. be used for the determination of the content of lead in gasoline.

I claim:

1. Apparatus for the determination of the content of at least one chemical element in a medium by an electromagnetic radiation method by the detection of backscattered and transmitted radiation, the apparatus comprising:
    at least one first radiation source arranged on one side of a test zone;
    at least one detecting means including a recording means, said detecting means being arranged on the same side of the test zone as said first radiation source; and
    at least one second electromagnetic radiation source located at a side of said test zone opposite said detecting means;
    said detecting means being adapted to detect both radiation emitted from said first radiation source and backscattered in the test zone and radiation emitted from said second radiation source and transmitted through the test zone.

2. An apparatus as in claim 1, wherein said second radiation source is a separate active radiation source.

3. An apparatus as in claim 1, wherein said second radiation source is a reflector capable of reflecting radiation emitted by said first radiation source.

4. An apparatus as in claim 1, wherein the energy of the radiation emitted from said first radiation source is different from that emitted by said second radiation source.

5. An apparatus as in claim 4, wherein said detecting means comprises means for discriminating between radiations of different energies.

6. An apparatus as in claim 1, wherein the radiation emitted by said first radiation source is $\gamma$-radiation and the radiation emitted by said second radiation source is X-radiation.

* * * * *